United States Patent [19]

Carter et al.

[11] 4,269,223
[45] May 26, 1981

[54] RESETTABLE PNEUMATIC OVERRUN CONTROL VALVE

[75] Inventors: Raymond D. Carter, Bryan; Allen L. Clark, Pioneer, both of Ohio

[73] Assignee: The Aro Corporation, Bryan, Ohio

[21] Appl. No.: 139,852

[22] Filed: Apr. 14, 1980

[51] Int. Cl.$^3$ ............................................. F16K 17/00
[52] U.S. Cl. .................................. 137/460; 137/517; 137/DIG. 2
[58] Field of Search .................. 137/460, 517, DIG. 2

[56] References Cited

U.S. PATENT DOCUMENTS

| | | | |
|---|---|---|---|
| 2,262,062 | 11/1941 | Strong | 137/DIG. 2 |
| 2,806,484 | 9/1957 | Sohultz | 137/460 |
| 2,926,690 | 3/1960 | Martin | 137/460 |
| 3,106,226 | 10/1964 | Machen | 137/517 X |
| 4,010,770 | 3/1977 | Peters | 137/460 |

*Primary Examiner*—Harold W. Weakley
*Attorney, Agent, or Firm*—Allegretti, Newitt, Witcoff & McAndrews

[57] ABSTRACT

A resettable overrun control valve includes a housing with a throughbore defining an inlet, an outlet and an intermediate valve seat. A valve disc is normally biased from the valve seat by a coil spring projecting the disc toward the inlet. An actuator stem connects to the valve disc and is responsive to a manually operable control rod projecting through the housing to engage the stem. Normal pneumatic pressure through the inlet permits air flow about the valve disc and through the outlet. If the pressure drop on the downstream side of the valve disc exceeds a predetermined limit, the valve disc is forced against the valve seat. This terminates air flow. Once the reason for the excessive air flow through the valve is corrected, the valve may be reset by actuating the manual rod against the stem. The biasing force on the valve disc is adjusted by means of a telescoping housing that cooperates with the valve body. The housing serves as an adjustable platform for the coil spring which biases the valve disc.

10 Claims, 10 Drawing Figures

RESETTABLE PNEUMATIC OVERRUN CONTROL VALVE

BACKGROUND OF THE INVENTION

In a principal aspect, this invention relates to an improved overrun control valve which is resettable and adjustable.

Air operated tools such as paint pumps or grinders can malfunction. In such instances the volume of air to the pneumatically operated apparatus or tool may drastically increase. Consequently, the pump or grinder may be destroyed or operate at such an excessive speed that all control of the tool is lost.

Various mechanisms have been proposed to sense the unsafe tool operating condition and to stop the air flow to the tool until the undesirable condition is corrected. One such mechanism is suggested by U.S. Pat. No. 3,618,689 which discloses a structure for an overrun control valve and pressure regulator. This valve device not only controls the pressure of pneumatic fluid to an air tool, but also automatically terminates excessive air flow through the valve to the tool. The disclosure of U.S. Pat. No. 3,618,689 is incorporated herewith by reference.

A recently available valve construction which provides a similar function is known as a flow check valve. This device responds automatically to an inordinate pressure reduction on the downstream side of the valve due to tool failure or air hose rupture, for example. Thus, if an air hose ruptures or is cut or accidentally uncoupled, the sudden pressure reduction on the downstream side of the Flow Check will close the valve automatically causing termination of substantially all of the air flow. Such a valve is disclosed in the drawing of the present application as prior art and is described in greater detail below.

While such prior art valves operate effectively and efficiently, the need exists for an improved flow check valve which is both adjustable and resettable. The present invention provides a compact, inexpensive and efficient construction providing such features.

SUMMARY OF THE INVENTION

Briefly the present invention comprises an improved, resettable, pneumatic overrun control valve which includes an air line housing having a throughbore connecting an inlet and an outlet. A seat is provided in the housing for cooperation with a valve member which is biased toward the inlet side. Means are provided for adjusting the biasing force on the valve member. Means are also provided for engaging a stem which extends from the valve member to actuate the valve member and reset the valve member as required.

It is thus an object of the present invention to provide an improved overrun control valve.

A further object of the present invention is to provide a flow check or control valve which is adjustable in the field during installation.

Still a further object of the present invention is to provide an improved flow check or control valve which is easily resettable preferably by a manual actuator.

Another object of the present invention is to provide inexpensive, reliable and highly efficient pneumatic overrun control valve.

These and other objects, advantages and features of the invention will be set forth in the detailed description which follows.

DESCRIPTION OF THE DRAWING

In the detailed description which follows, reference will be made to the drawing comprised of the following figures.

DESCRIPTION OF THE PREFERRED EMBODIMENT

Figure 1:
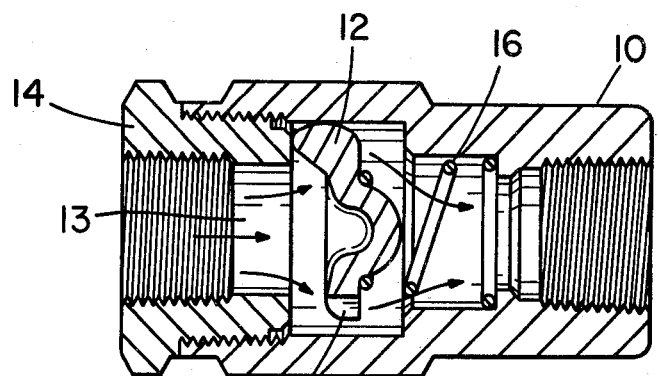
FIG. 1 is a side cross sectional view of a prior art flow check valve during normal operation.
Figure 2:
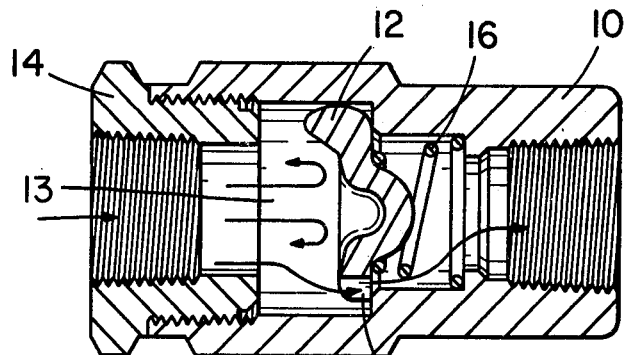
FIG. 2 is a side cross sectional view of the flow check valve of FIG. 1 subsequent to a flow surge.
Figure 3:
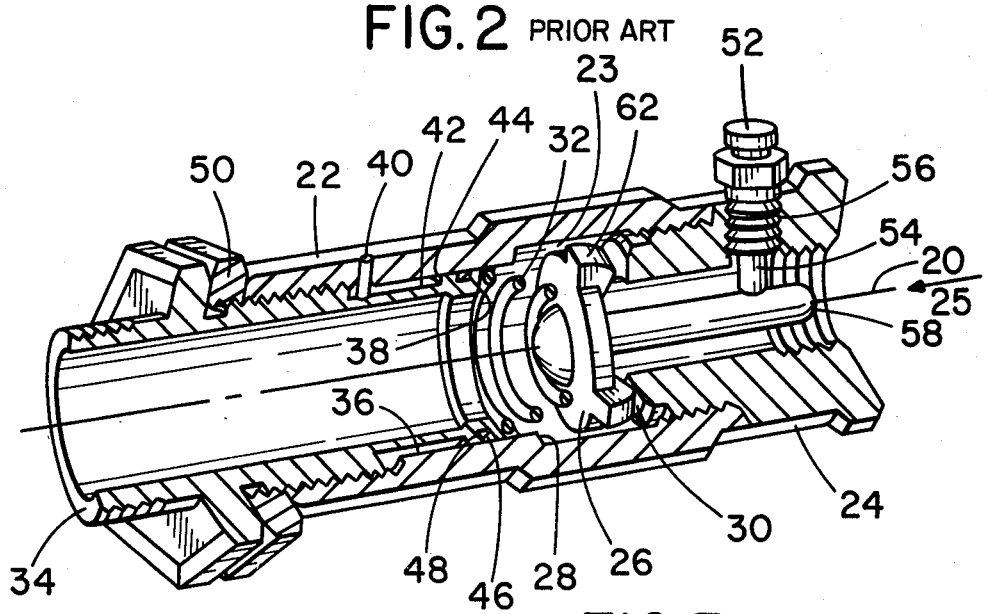
FIG. 3 is a perspective cutaway view of the improved overrun control valve of the present invention.

FIGS. 1 and 2 illustrate a prior art flow check valve which includes a body 10 having a poppet valve disc 12 retained in a throughbore 13 by an adaptor 14. The valve disc 12 is biased by a conical coil spring 16 toward the adaptor 14. Slots 18 are provided on the periphery of the poppet valve disc 12 to permit air flow through the throughbore. During normal operation air pressure on each side of the disc 12 is about equal and the disc 12 is held open by spring 16 thus allowing a generally unrestricted air flow. When a hose breaks on the downstream side of the check valve or air is otherwise caused to surge through the check valve, air pressure on the downstream side of the disc 12 decreases and the disc 12 is compressed against the force of the spring 14 by inlet air pressure. This causes the disc 12 to seat. The disc 12 remains seated as long as the pressure force on the upstream side is greater than the combined spring and pressure force on the downstream side.

A small bleed hole in disc 12 permits the escape of some air through the disc 12. Thus, after repair on the downstream side of the check valve, air pressure can equalize on each side of the valve permitting the spring 16 to return the disc 12 to the position shown in FIG. 1.

FIGS. 3–10 illustrate the improved overrun control valve of the present invention. Referring to those figures, the valve is generally symmetrical about a center line axis 20. The valve includes a body 22 with a throughbore 23 which receives a theaded, annular adaptor 24 defining an inlet 25. The adaptor 24 retains a valve member 26 intermediate a seat 28 in the throughbore 23 and inner end 30 of the adaptor 24. The valve 26 is biased by a conical coil spring 32 toward the adaptor 24.

A tubular spring retaining member 34 is threaded into outlet end 36 of body 22 and projects into the throughbore 23. The member 34 defines a land 38 which supports the conical spring 32. A stop pin 40 is inserted into the body 22 and fits within an annular groove 42 in outer surface of tubular member 34 to limit the outward travel of the tubular member 34 from the body 22 by engagement with flange 44. An O-ring seal 46 positioned in a groove 48 in flange 44 seals the tubular member 34 with the body 22. A locking nut 50 is provided to lock the telescoping tubular member 34 in position relative to the body 22.

A reset button 52 is mounted in adaptor 24 and includes a projecting rod 54 which passes through a sealed passage 56 in the side of adaptor 24. The rod 54 is positioned to engage an axially projecting stem 58 extending upstream from the valve 26. The component parts are generally symmetrical about the axis 20 except that the valve 26 includes three equally spaced lobes 62 which maintain the valve 26 in proper position with respect to the seat 28. The reset button 52, as well as the pin 40, are also non-symmetrical components of the total assembly.

Figure 4:
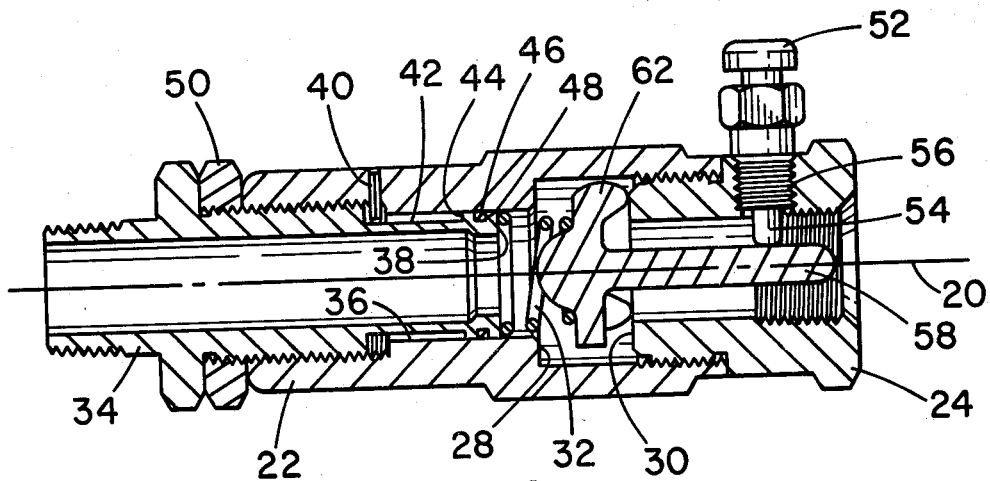
FIG. 4 is a side cross sectional view of the valve of FIG. 3 prior to installation and adjustment in a pneumatic line.

FIGS. 4-10 illustrate the sequence for setting and operating the valve of the present invention. Thus, referring to FIG. 4, before a pneumatic air supply is turned on, the nut 50 is loosened and the body 22 is turned clockwise to a position of maximum thread engagement with tubular member 34 as illustrated by FIG. 4.

Figure 5:
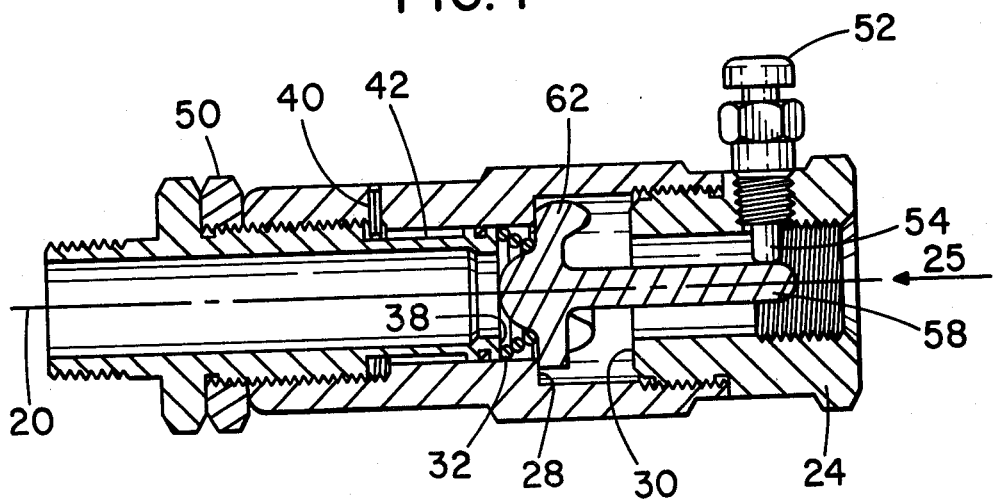
FIGS. 5–10 are cross sectional views similar to FIG. 4 which sequentially illustrate subsequent steps in the adjustment and operation of the valve of the present invention.
Figure 6:
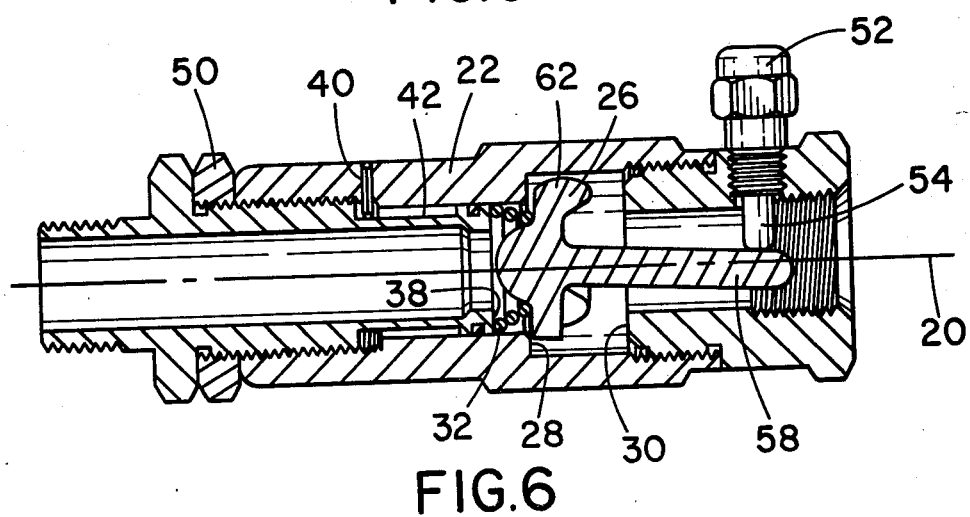
Figure 7:
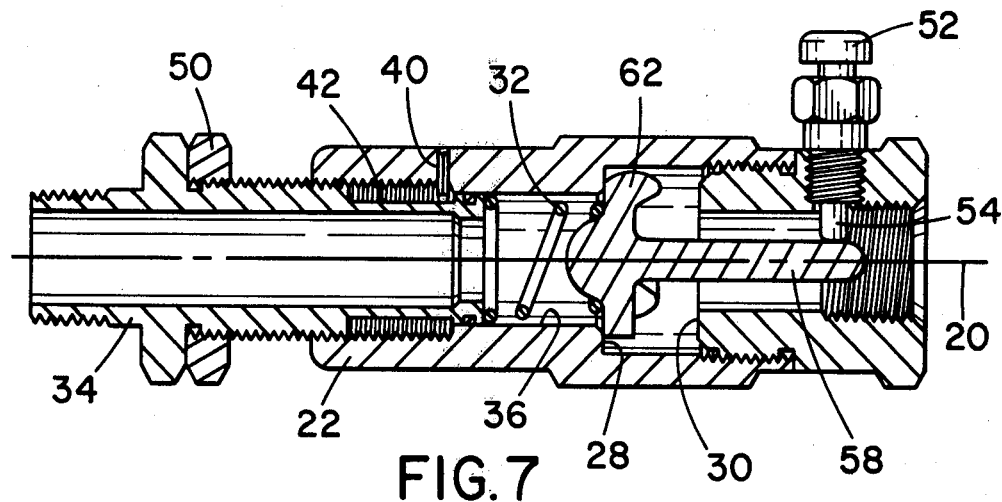

Referring next to FIG. 5, a supply of air is provided to the inlet 25 through the adaptor 24 at the desired operating pressure. Next, as shown in FIG. 6, the reset button 52 is depressed to permit air to flow about the valve 26 to start the device such as a pump or the like which is being pneumatically operated downstream from the valve.

Figure 8:
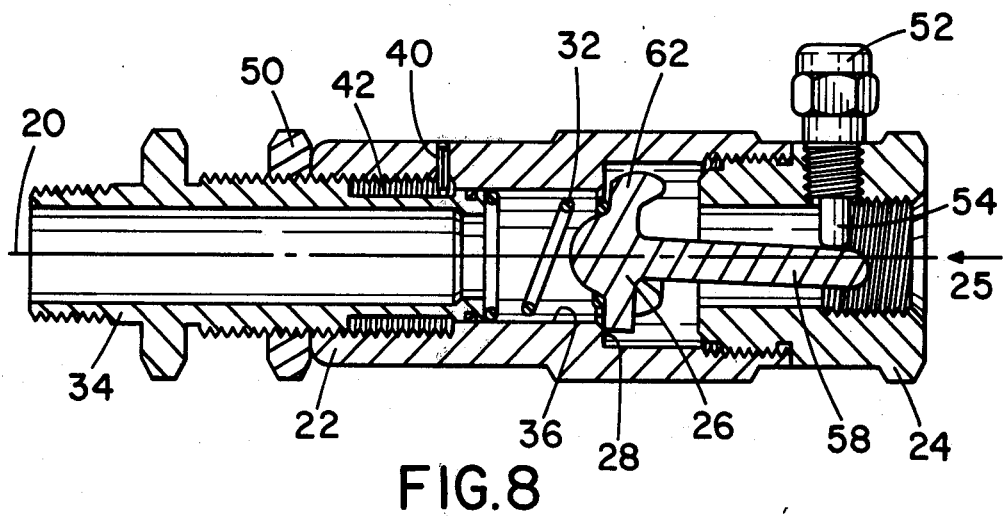
Figure 9:
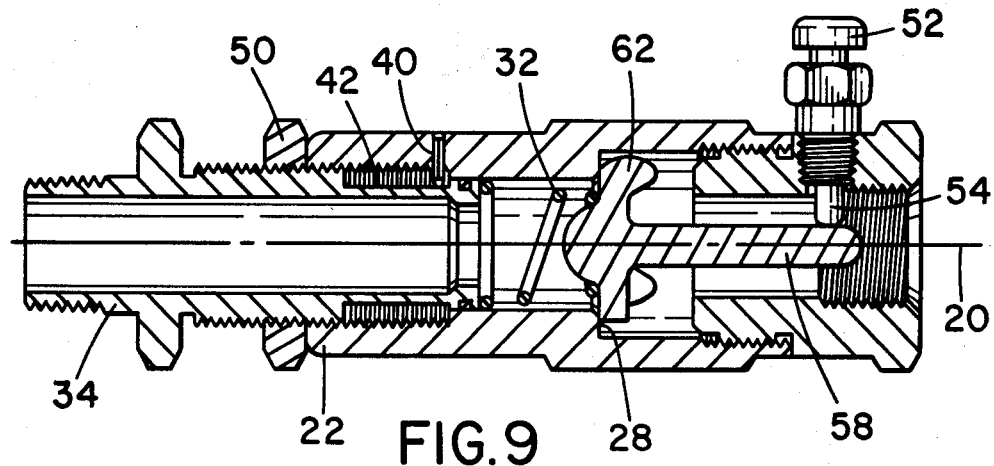
Figure 10:
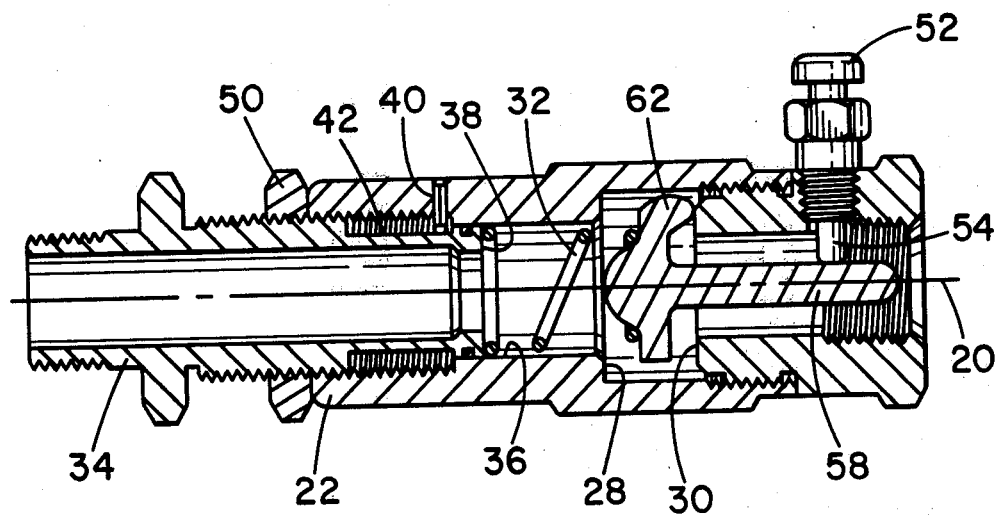

While the pump or the like is being operated, the body 22 is turned in a counterclockwise direction until the a pump shuts off. When the pump shuts off, the body 22 is rotated in a reverse or clockwise sense approximately one turn to the position illustrated in FIG. 7. Then the nut 50 is securely tightened against the body 22 as shown in FIG. 8. This fixes the position of the tubular member 34 with respect to the body 22 and thereby adjusts the biasing force of the spring 32 precisely for the specific equipment (pump, etc.) being operated by the specific air line pressure through the inlet 25 of the adaptor 24. The valve 26 is then opened by depressing the button 52. This permits spring 32 to retain the valve 26 open for normal operation of the equipment.

When an inordinant surge of air is demanded by or when the hose on the downstream side of the valve 26 ruptures or the equipment (e.g. when the equipment accelerates beyond a desired limit) valve 26 will automatically close against the seat 28 because of the reduced pressure on the downstream side of the valve 26. The valve 26 is retained against the seat 28 by virtue of pneumatic pressure through the inlet 25 of the adaptor 24. The equipment may then be repaired or replaced as necessary while the valve 26 is retained in the position shown in FIG. 9. Subsequently, when repairs are completed, the equipment may be restarted by depressing the reset button as shown in FIG. 8 to cause the valve 26 to assume the position shown in FIG. 10. The device is then operating in a normal mode.

Thus, with the present invention, it is possible to precisely adjust the biasing force on control valve 26 for each particular set of requirements of fluid source pressure and fluid use by the equipment. Additionally, the device provides for overload protection and also permits automatic resetting once the cause of a sudden pressure drop (i.e., system overload) is repaired. Thus, while a preferred embodiment of the present invention has been described, it is to be understood that the invention is to be limited only by the following claims and their equivalents.

What is claimed is:

1. An improved resettable pneumatic overrun control valve comprising, in combination:
   an air line housing having a throughbore with an inlet and an outlet;
   a seat in the throughbore upstream from the outlet;
   a valve member for closing the throughbore by cooperative engagement with the seat when translated toward the outlet, said valve member including a stem projecting in the throughbore;
   biasing means intermediate the valve member and the housing for biasing the valve member toward the inlet;
   means for adjusting the biasing force on the valve member in the housing; and
   means projecting through the housing for engaging the stem to pivot the valve member from the seat and breaking the seal of the valve member on the seat.

2. The improved valve of claim 1 wherein said housing includes a body member defining the seat and said means for adjusting includes an adjustable telescoping tubular member at the outlet end of the housing providing an adjustable support for the biasing means.

3. The improved valve of claim 1 wherein the valve member includes a valve disc cooperative with the seat and a stem projecting axially toward the inlet from the center of the disc.

4. The improved valve of claim 2 wherein the tubular member is telescoped into the body member.

5. The improved valve of claim 2 wherein the housing includes a stop member that limits the travel of the tubular member.

6. The improved valve of claim 1 wherein the valve member includes a disc member for cooperation with the seat and a plurality of peripheral lobes on the disc member for orienting the valve member with respect to the seat.

7. The improved valve of claim 1 wherein the biasing means comprise a conical coil spring.

8. The improved valve of claim 1 wherein the means projecting through the housing comprise a drive rod projecting transverse to the stem and engaging the stem, said drive member extending through the housing and including an external engagement surface for driving the rod against the stem to pivot the valve member on the valve seat.

9. The improved valve of claim 1 including locking means for locking the means for adjusting and thereby fixing the biasing force on the valve member.

10. The improved valve of claim 2 including a locking nut to lock the tubular member in fixed telescoped relation to the body member.

* * * * *